United States Patent [19]

Beauchamp et al.

[11] Patent Number: 5,339,331
[45] Date of Patent: Aug. 16, 1994

[54] FREQUENCY HOPPING SPREAD SPECTRUM RECEIVER

[75] Inventors: Bruce A. Beauchamp; James C. Beffa, both of Sunnyvale; David H. Flournoy, Livermore, all of Calif.

[73] Assignee: Lockheed Corporation, Calabasas, Calif.

[21] Appl. No.: 119,779

[22] Filed: Sep. 9, 1993

[51] Int. Cl.$^5$ .......................... H04L 27/30; H04L 9/00
[52] U.S. Cl. .......................................................... 375/1
[58] Field of Search ............................................. 375/1

[56] References Cited

U.S. PATENT DOCUMENTS

| | | | |
|---|---|---|---|
| 4,222,115 | 9/1980 | Cooper et al. | 375/1 |
| 4,267,592 | 5/1981 | Craiglow | 375/1 |
| 4,351,064 | 9/1982 | Ewanus | 375/1 |
| 4,355,399 | 10/1982 | Timor | 375/1 |
| 4,392,231 | 7/1983 | Henry | 375/1 |
| 4,558,453 | 12/1985 | Mimken | 375/1 |
| 4,601,043 | 7/1986 | Hardt et al. | 375/1 |
| 4,630,282 | 12/1986 | Landers et al. | 375/1 |
| 4,653,068 | 3/1987 | Kadin | 375/1 |
| 4,728,922 | 3/1988 | Christen et al. | |
| 4,979,183 | 12/1990 | Cowart | 375/1 |
| 5,029,180 | 7/1991 | Cowart | 375/1 |
| 5,029,182 | 7/1991 | Cai et al. | 375/1 |
| 5,111,478 | 5/1992 | McDonald | 375/1 |
| 5,230,076 | 7/1993 | Wilkinson | 375/1 |
| 5,274,666 | 12/1993 | Dowdell et al. | 375/1 |

OTHER PUBLICATIONS

Schilling et al. "Spread Spectrum Goes Commercial" IEEE Spectrum, Aug. 1990, pp. 40–45.
Rice, Bart "A Transceiver Design for a High Information Rate LPI Network" Lockhead Missiles & Space Company, Inc.

*Primary Examiner*—Salvatore Cangialosi
*Attorney, Agent, or Firm*—Kenneth R. Allen; Babak S. Sani

[57] ABSTRACT

A frequency hopping spread spectrum receiver that does not require an independent synchronization source to receive and track a frequency hopping transmitter signal. In a search mode, the receiver of this invention hops in a reverse direction and at a faster rate than the transmitter hopping pattern. This results in faster signal acquisition time. The receiver uses the audio data tones of the transmit signal to detect and synchronize to the transmitter signal. Once in track mode of operation, a frequency hopping hysteresis ensures against erroneous detection of signal loss by tracking the transmitter hopping pattern for several consecutive hops before switching back to search mode.

9 Claims, 3 Drawing Sheets

FREQUENCY HOPPING SPREAD SPECTRUM RECEIVER

BACKGROUND OF THE INVENTION

This invention relates to digital spread spectrum communication in a variable propagation environment where there is radio frequency (RF) interference, such as in mobile communications in the high UHF bands. More particularly, the invention relates to a frequency hopping spread spectrum mobile receiver in the 900 MHz industrial band.

According to FCC regulations, the 900 MHz band is available under certain circumstances for industrial communications without special licensing. One mode of communications is spread spectrum, wherein a transmitted signal is spread over a frequency band that is much wider than the minimum bandwidth required to transmit particular information. This makes spread spectrum signals difficult to intercept and therefore suitable for private radio communication. There are two main spread spectrum techniques, direct sequence spectrum spreading and frequency hopping. Secure communication is provided by "tagging" the signal with a direct sequence or frequency hopping pattern that only the user's receiver recognizes.

In frequency hopping spread spectrum communication, the transmitter remains at a selected frequency for a few milliseconds dwell time, transmits useful information during a fraction of the dwell time, and then changes frequency to other frequencies in a predetermined pseudo-random pattern. The transmitter can be tracked by receivers having knowledge of the pseudo-random hopping pattern.

Spread spectrum communication is used in mobile communication systems which are often subject to poor RF environments. The poor RF environment arises because the receiver is located in a moving vehicle, subject to high ambient RF background noise, and blockage or interference from natural or man-made structures. Sporadic interferences may cause temporary loss of signal that may in turn cause the receiver to switch out of its signal tracking mode. The receiver is then required to restart the signal search and synchronization process. Moreover, existing synchronization methods typically employ an independent synchronization source such as a broad-band spectrum analyzer which increase the total signal acquisition time, as well as the cost and complexity of the receiver.

There is, therefore, a need for a low cost receiver capable of quick acquisition and reliable tracking of a frequency hopping digital signal transmitted in a poor RF environment.

SUMMARY OF THE INVENTION

The present invention provides a receiver circuit and an improved control algorithm for the same, that can receive and track a frequency hopping transmitter without an independent synchronization source. The frequency hopping receiver of the present invention minimizes signal acquisition time and maximizes transmitter signal tracking reliability for signals in a poor RF environment.

In one embodiment, the present invention provides a receiver for receipt of a spread spectrum frequency hopping signal with a predetermined hopping pattern that is modulated using audio frequency data tones. The receiver includes a signal detect circuit, an analog to digital (A/D) converter, a demodulator, a microprocessor and a frequency synthesizer. The receiver operates in two modes: a search mode and a track mode. In search mode, the frequency synthesizer controls the signal detect frequency by stepping it through the hopping pattern in the reverse direction and at a faster rate than that of the transmitter signal. This minimizes the signal interception time for the receiver. Once the demodulator detects the audio data tones and the A/D converter indicates a strong signal, the microprocessor determines that a valid signal is being received. The microprocessor then enters a track mode and controls the hopping pattern of the synthesizer to track that of the transmitter (i.e. in the forward direction and at the same rate as the received signal).

The receiver of the present invention further provides for a frequency hopping inertia by switching from the track mode to search mode only after ensuring that no valid signal is present for a number of consecutive hops. this reduces the incidence of erroneous switching from track mode to search mode by the receiver.

A further understanding of the nature and advantages of the frequency hopping receiver of the present invention may be gained by reference to the following detailed description and drawings.

DESCRIPTION OF SPECIFIC EMBODIMENTS

Figure 1:
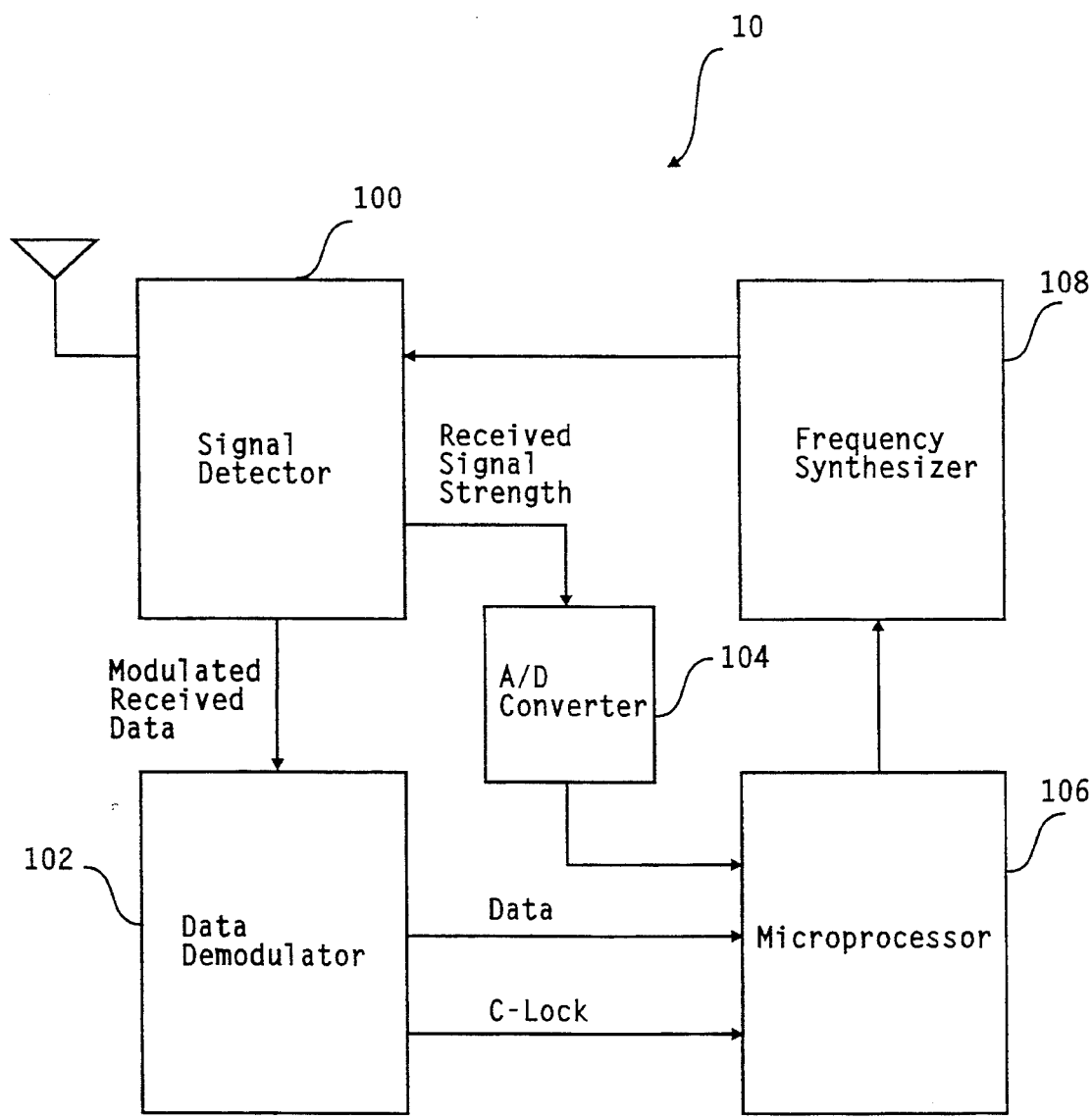
FIG. 1 is a block diagram of the frequency hopping receiver of the present invention.

FIG. 1 is a block diagram of a specific embodiment of the frequency hopping receiver 10 of the present invention. The receiver 10 includes a signal detector 100 with an input for receipt of a signal from a remote transmitter (not shown). Signal detector 100 couples forms of the received signal to a data demodulator 102 and an analog to digital (A/D) converter 104. A data output and a carrier-lock (or C-Lock) output from data demodulator 102 connect to a microprocessor 106. The A/D converter 104 generates an output data representing the strength of the received signal and couples that information to microprocessor 106. Microprocessor 106 controls a frequency synthesizer 108 that is used to program the frequency of signal detector 100.

In operation, signal detector 100 is a frequency-scanning receiver which searches for and detects any signals present at the receiver input at particular frequencies, and in particular signals transmitted according to a known hopping pattern. The signal received at a single frequency is demodulated by data demodulator 102. Data demodulator 102 also looks for the audio data tones of the received signal and, when detected, generates a C-Lock output. A/D converter 104 examines the strength of the received signal and generates a, for example 8-bit, digital output representing the strength of the signal. Microprocessor 106 receives the demodulated data, C-Lock and the signal strength information. Based on the received signal strength data and the state of C-Lock, microprocessor 106 decides whether valid data is being received. As long as no valid data is received, the receiver 10 remains in search mode wherein microprocessor 106 instructs frequency synthesizer 108 to change the frequency of signal detector 100 in the reverse direction of a hopping pattern of a transmitter whose hopping pattern is known to the microprocessor 106 and at a rate of, for example, ten times that of the transmitter hopping rate. Once C-Lock is asserted and a strong signal is detected, microprocessor 106 switches into track mode and locks on to the transmitter hopping pattern by instructing frequency synthesizer 108 to change the frequency of signal detector 100 according to the transmitter hopping pattern and at the same rate.

Figure 2:
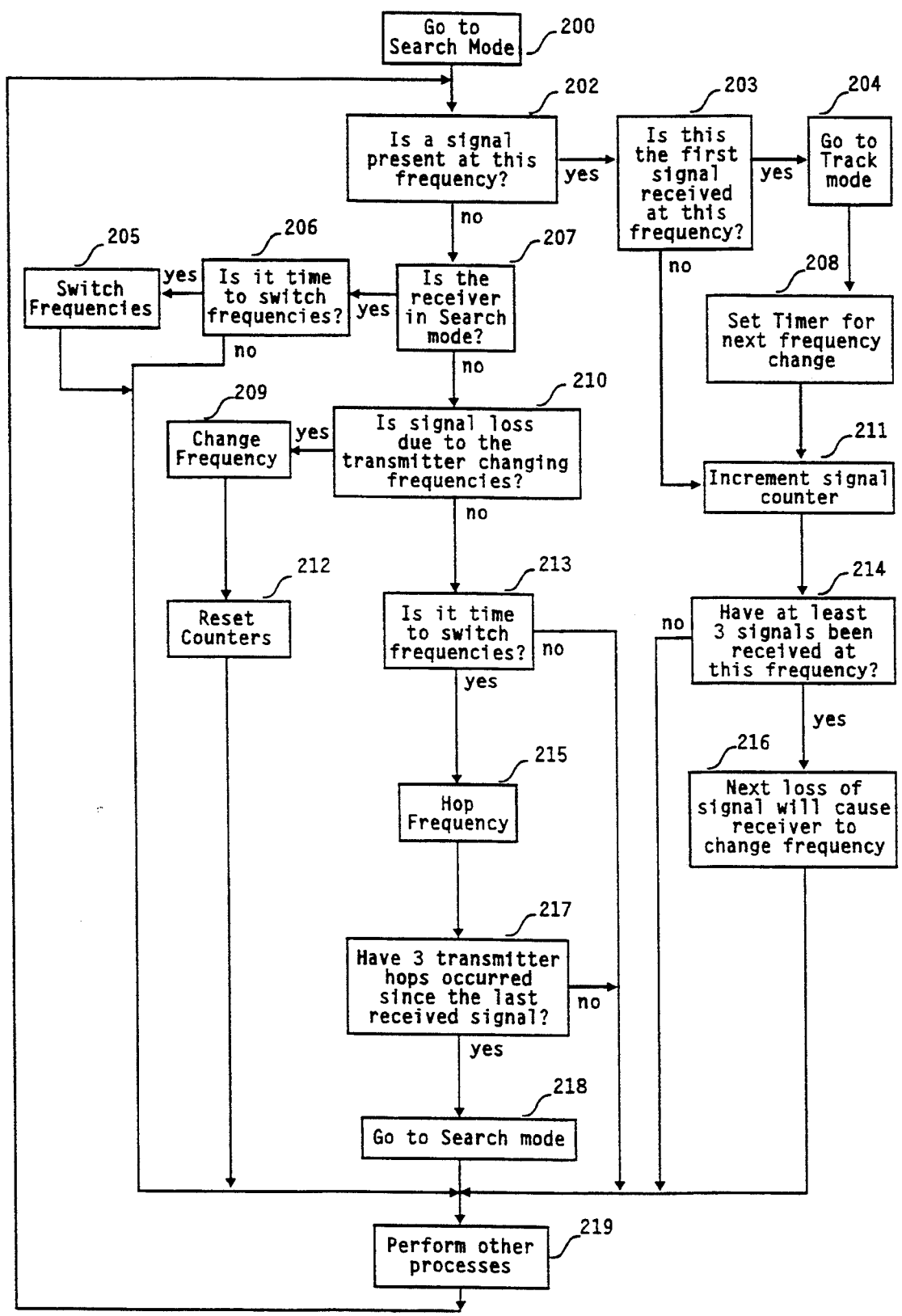
FIG. 2 is a flow diagram illustrating the operation of the frequency hopping receiver in search and track modes.

FIG. 2 is a flow diagram showing the control algorithm for the receiver 10 of the present invention. For purposes of this description, the transmitted frequency hopping signal is assumed to include, for example, 63 frequencies distributed in a pseudo-random pattern somewhere within the range of 900 MHz to 925 MHz. It is further assumed that the transmitter remains for a period of, for example, 100 ms at each frequency before switching to the next. During initialization, the receiver 10 defaults to the search mode. Starting from the last frequency (i.e. the 63rd) in the hopping pattern, the receiver 10 switches frequencies in the reverse direction of the pattern, every 10 ms (i.e. ten times faster than the transmitter hopping rate). This process is shown in steps 200, 202, 207, 206 and 205 of FIG. 2. At step 202 microprocessor 106 decides whether a valid transmitter signal is being received at one of the 63 frequencies, for example the 63rd. The details of the signal detection process will be described hereafter in connection with the flow diagram of FIG. 3. If a transmitter signal is not detected at the 63rd frequency and the receiver 10 has not been in track mode (step 207), the receiver 10 waits for 10 ms (step 206) before changing its frequency to the 62nd frequency (step 205). This process continues for as long as the receiver 10 is in search mode.

Figure 3:
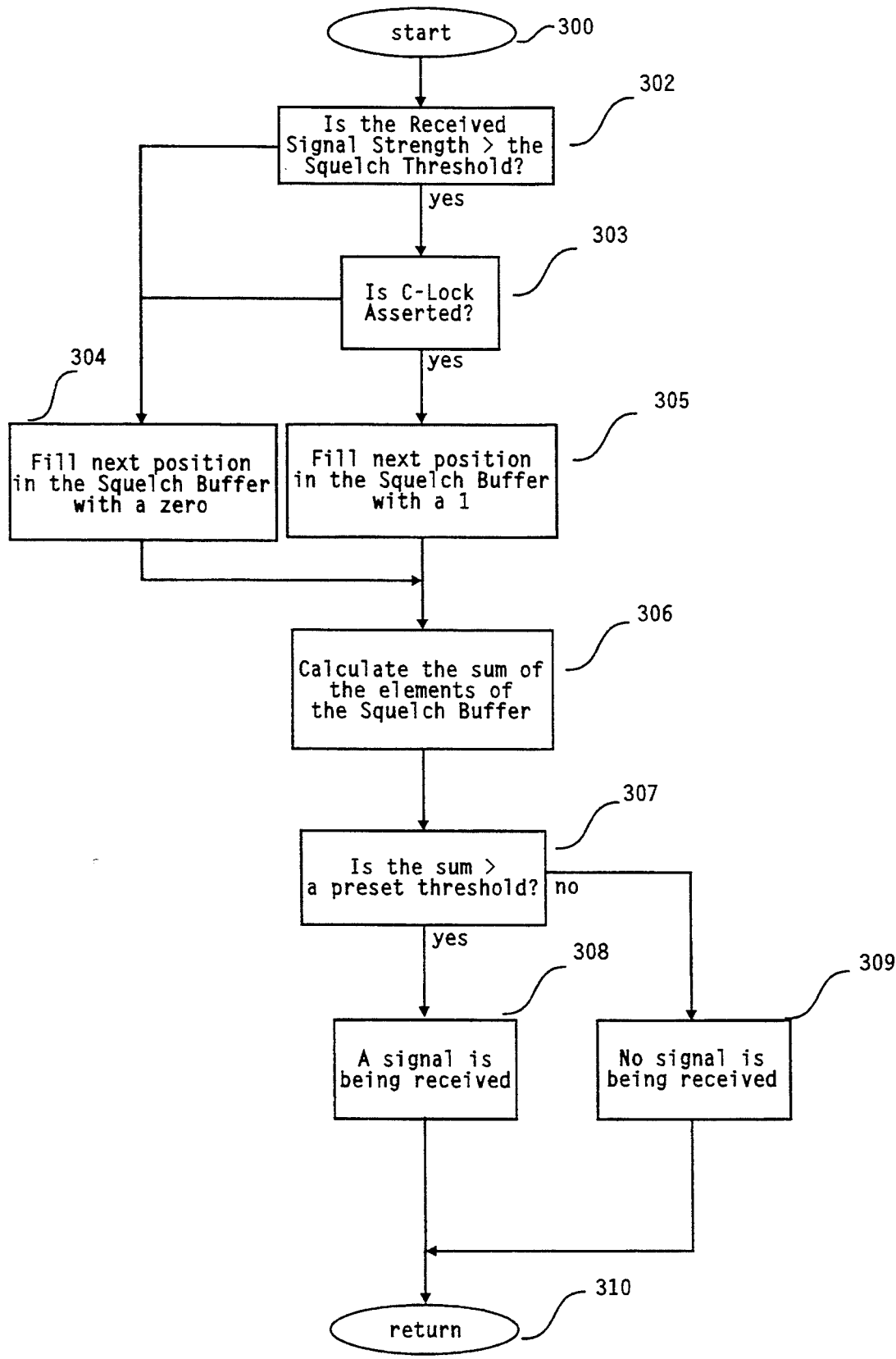
FIG. 3 is a flow diagram illustrating the signal detection and synchronization process of the frequency hopping receiver in search mode.

The received signal strength can drift up and down due to noise interferences, multipath fading or poor antennas. To improve reliability of signal detection under these conditions, the present invention utilizes a moving-average-based signal detection algorithm which measures the average strength of several, for example ten, of the most recently received signals. FIG. 3 is a flow diagram showing the signal detection algorithm of the present invention. In a first step 302 the received signal strength is compared to a squelch threshold. The value of the squelch threshold is determined based on measurements of time-varying broad band noise, Any suitable squelch mechanism can be used to set the value of the squelch threshold, although a reliable time-dependent adaptive digital squelch mechanism is preferred. If the received signal strength is below the squelch threshold level, or it is greater than the squelch level and C-Lock is not asserted (i.e. transmitter audio data tones not detected), a zero is entered into a circular squelch buffer (not shown) associated with the microprocessor 106 (step 304). The circular squelch buffer includes the desired number of positions over which the average is to be calculated. In this example, the number of entries is set to ten. When the signal strength is greater than the squelch threshold level and C-Lock is asserted (step 303), then the next position in the squelch buffer is filled with a one (step 305). After each entry into the buffer, the sum of all ten positions is calculated (step 306) and compared to a preset threshold (step 307). This threshold is set based on the communication environment, including the type of modems used and the level of attendant noise. For a higher threshold level, it takes longer to detect a received signal and faster to detect no signal, and visa versa. With the threshold level set at, for example, 70%, it will take seven entries of ones to detect that a signal is being received (step 308). As long as the sum of the entries in the squelch buffer remains below seven indicating that no signal is being received (step 309), the signal detection algorithm continues the averaging process.

The combination of the reverse direction search at a higher rate, transmitter audio data tones (C-Lock) and moving-average signal strength detection eliminates the need for an independent synchronization source and ensures fast and highly reliable signal acquisition.

Referring back to FIG. 2, the track mode of operation in the frequency hopping control algorithm of the present invention will be described. Once the receiver 10 detects receipt of a valid transmitter signal at a given frequency (step 202), it checks the status of a received signal counter (step 203). If the counter indicates that it is the first time a signal has been received at that frequency, the receiver 10 switches to track mode of operation (step 204), sets a 100 ms timer (step 208), and increments the received signal counter (step 211). The receiver 10 remains at that frequency until the transmitter signal changes frequency, at which time the receiver 10 detects a loss of signal. This signal loss triggers the receiver hopping mechanism. However, when the transmitter signal hops to a new frequency, the first few samples of the received signal are very unstable due to excessive jitter and noise. Because of the intermittent reception of signal immediately after a transmitter hop, the receiver must ensure that an initial (or any other spurious) signal loss does not trigger the frequency hopping mechanism. Therefore, the receiver 10 counts the reception of a minimum number of (for example three) signals at a given frequency (steps 203, 211 and 214), before treating the next signal loss as a transmitter signal hop. If the minimum number of signals have been received, the receiver sets a flag indicating that the next loss of signal is due to a transmitter signal hop (step 216).

Returning to step 202 of the flow diagram (FIG. 2), the operation of the receiver 10 will be discussed when the signal is lost in track mode of operation. Under loss of signal conditions, the microprocessor 106 checks the frequency hop flag (step 210) that is set in step 216. If the flag is set, the microprocessor 106 causes the frequency synthesizer 108 to change the signal detector 100 to the next frequency (step 209) and resets all counters (none shown), including the received signal counter (not shown) (step 212). However, if the flag is not set (i.e. the minimum number of signals at the particular frequency have not been received), the microprocessor 106 checks how much time has elapsed since the reception of the first signal at this frequency (step 213). This timing information is provided by step 208. If the 100 ms dwell time has not passed since the reception of the first signal, the receiver 10 remains at the same frequency expecting reception of another valid signal. After 100 ms, if there is still no signal detected, instead of terminating the track mode and switching to search mode, the receiver 10 hops to the next frequency (step 215), increments a frequency hop counter (not shown) (step 217) and continues to look for a valid transmitter signal. The number of hops stored by the frequency hop counter determines the degree of inertia of the reception pattern. This inertia to remain in the track mode will ensure that a spurious loss of signal does not cause a total loss of signal which would require the receiver to re-enter search mode unnecessarily and waste time to resynchronize. The receiver 10 can continue hopping for several, for example three (step 217), counts searching for a valid transmitter signal before switching back to the search mode. This frequency hopping inertia, as well as the mechanism to prevent frequency hopping due to spurious signal loss, improves the reliability of signal tracking for a spread spectrum frequency hopping receiver.

In conclusion, the present invention provides a receiver circuit and an improved control algorithm for the same, that can receive and track a frequency hopping transmitter without an independent synchronization source. The receiver of the present invention minimizes signal acquisition time and maximizes transmitter signal tracking reliability for signals in a poor RF environment. While the above is a complete description of the specific embodiment of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A receiver for receipt of a frequency hopping spread spectrum signal with a predetermined hopping pattern and modulated using audio frequency signals, the receiver comprising:

signal detect means, coupled to receive the frequency hopping signal, for detecting a received signal at a given frequency;

means, coupled to said signal detect means, for measuring a strength of said received signal;

means, coupled to said signal detect means, for demodulating said received signal and detecting the audio frequency signals;

microprocessor means coupled to said signal detect means, measuring means and demodulating means for determining a presence of valid received signal; and means, coupled to said signal detect means and controlled by said microprocessor means, for stepping a frequency of said signal detect means through the predetermined hopping pattern.

2. The receiver of claim 1, wherein said means for measuring a strength of said received signal is an analog to digital converter.

3. The receiver of claim 1, wherein said means for stepping a frequency of said signal detect means through the predetermined pattern is a frequency synthesizer.

4. The receiver of claim 1, wherein said microprocessor means includes a search mode of operation wherein said stepping means steps said frequency of said signal detect means in a direction opposite to a direction of the predetermined hopping pattern.

5. The receiver of claim 4, wherein, in said search mode, said stepping means steps said frequency of said signal detect means in a direction opposite to said direction of the hopping pattern and at a faster rate than a rate of the hopping pattern.

6. The receiver of claim 1, wherein said microprocessor means includes a track mode of operation wherein said stepping means locks on to the hopping pattern and continues hopping even after a signal loss for a predetermined number of hops before resetting.

7. A method for receiving a frequency hopping spread spectrum signal with a predetermined hopping pattern and modulated using audio frequency signals, comprising the steps of:

(a) receiving a signal at a signal detector input terminal in a search mode;

(b) demodulating and detecting the audio frequency signals of said received signal;

(c) measuring an amplitude of said received signal; and (d) detecting receipt of the frequency hopping signal in response to said audio frequency signals detecting and amplitude measuring steps.

8. The method of receiving a frequency hopping signal as in claim 7, further comprising the steps of:

(e) stepping a frequency of said signal detector through the predetermined hopping pattern at a rate faster than a rate of the frequency hopping signal and in a reverse direction, in said search mode; and (f) tracking the received frequency hopping signal by stepping a frequency of said signal detector through the predetermined hopping pattern at a rate equal to said rate of the frequency hopping signal in a forward direction, in a track mode.

9. The method of receiving a frequency hopping signal as in claim 8, further comprising the steps of:

(g) continuing to hop in the forward direction for a predetermined number of times even after loss of signal; and (h) terminating said track mode and returning to said search mode only if no valid signal is detected after said forward hop for a predetermined number of times.

* * * * *